(12) United States Patent
Kotecha et al.

(10) Patent No.: US 8,027,309 B2
(45) Date of Patent: Sep. 27, 2011

(54) LOW LATENCY HANDOVER BETWEEN WIRELESS COMMUNICATION NETWORKS USING DIFFERENT RADIO ACCESS TECHNOLOGIES

(75) Inventors: Lalit Ratilal Kotecha, Union City, CA (US); Jin Yang, Walnut Creek, CA (US)

(73) Assignee: Cellco Partnership, Basking Ridge, NJ (US)

( * ) Notice: Subject to any disclaimer, the term of this patent is extended or adjusted under 35 U.S.C. 154(b) by 981 days.

(21) Appl. No.: 11/984,462

(22) Filed: Nov. 19, 2007

(65) Prior Publication Data

US 2009/0201878 A1    Aug. 13, 2009

(51) Int. Cl.
*H04B 7/216* (2006.01)
*H04L 12/56* (2006.01)

(52) U.S. Cl. .................. 370/331; 370/401; 370/466
(58) Field of Classification Search .............. 370/329, 370/331, 401, 466
See application file for complete search history.

(56) References Cited

U.S. PATENT DOCUMENTS

| | | | | |
|---|---|---|---|---|
| 5,940,771 | A * | 8/1999 | Gollnick et al. | 455/517 |
| 7,539,138 | B2 * | 5/2009 | Maenpaa | 370/235 |
| 2006/0146803 | A1 | 7/2006 | Bae et al. | |
| 2006/0245408 | A1 | 11/2006 | Lee et al. | |
| 2006/0246903 | A1 | 11/2006 | Kong et al. | |
| 2007/0115899 | A1 | 5/2007 | Ovadia et al. | |

OTHER PUBLICATIONS

International Search Report and Written Opinion of the International Searching Authority issued in International Application No. PCT/US08/84001 dated on Jan. 12, 2009.
International Preliminary Report on Patentability issued in International Application No. PCT/US2008/084001 filed Nov. 29, 2008.
"Configuring Proxy Mobile IP" CISCO IOS Software Configuration Guide for CISCO Aironet Access Points, Chapter 15, pp. 15-1-15-10.
"3rd Generation Partnership Project; Technical Specification Group Services and System Aspects; 3GPP System Architecture Evolution: GPRS enhancements for E-UTRAN access; Release 8", 3rd Generation Partnership Project, 3GPP TS 23.402, V0.4.1 Apr. 2007.
Leung et al., "Mobility Management using Proxy Mobile IPv4 draft-leung-mip4-proxy-mode-02.txt", The Internet Society, pp. 1-16, Jan. 10, 2007.
Gubdavelli et al., "Proxy Mobile IPv6 draft-Ietf-netImm-proxymip6-06. txt" The ITEFT Trust, draft expires on Mar. 26, 2007.
"3rd Generation Partnership Project; Technical Specification Group Services and System Aspects; 3GPP System Architecture Evolution: GPRS enhancements for E-UTRAN access; Release 8", 3RD Generation Partnership Project, 3GPP TS 23.401, V0.4.1, Apr. 2007.

* cited by examiner

*Primary Examiner* — John Pezzlo
(74) *Attorney, Agent, or Firm* — McDermott Will & Emery LLP (57) ABSTRACT

A communications system for providing a user's mobile station (MS) with an Internet Protocol (IP) connectivity, has an IP network gateway for allocating an IP address to the MS to enable it to access an IP network. First and second base stations are respectively configured to support communications of the MS over first and second radio access networks using different radio access technologies. A first access gateway provides an interface between the IP network gateway and the first radio access network, whereas a second access gateway provides an interface between the IP network gateway and the second radio access network. A handover interface is provided between the first access gateway and the second access gateway for enabling the MS to switch between the first and second radio access networks with minimum latency.

23 Claims, 7 Drawing Sheets

FIG. 1
BACKGROUND

LOW LATENCY HANDOVER BETWEEN WIRELESS COMMUNICATION NETWORKS USING DIFFERENT RADIO ACCESS TECHNOLOGIES

TECHNICAL FIELD

This disclosure relates to wireless communication networks, and more particularly, to systems and methods for supporting handover performed when a user's mobile station (MS) moves from a wireless communication network that uses one radio access technology to a wireless communication network that uses another radio access technology.

BACKGROUND

Figure 1:
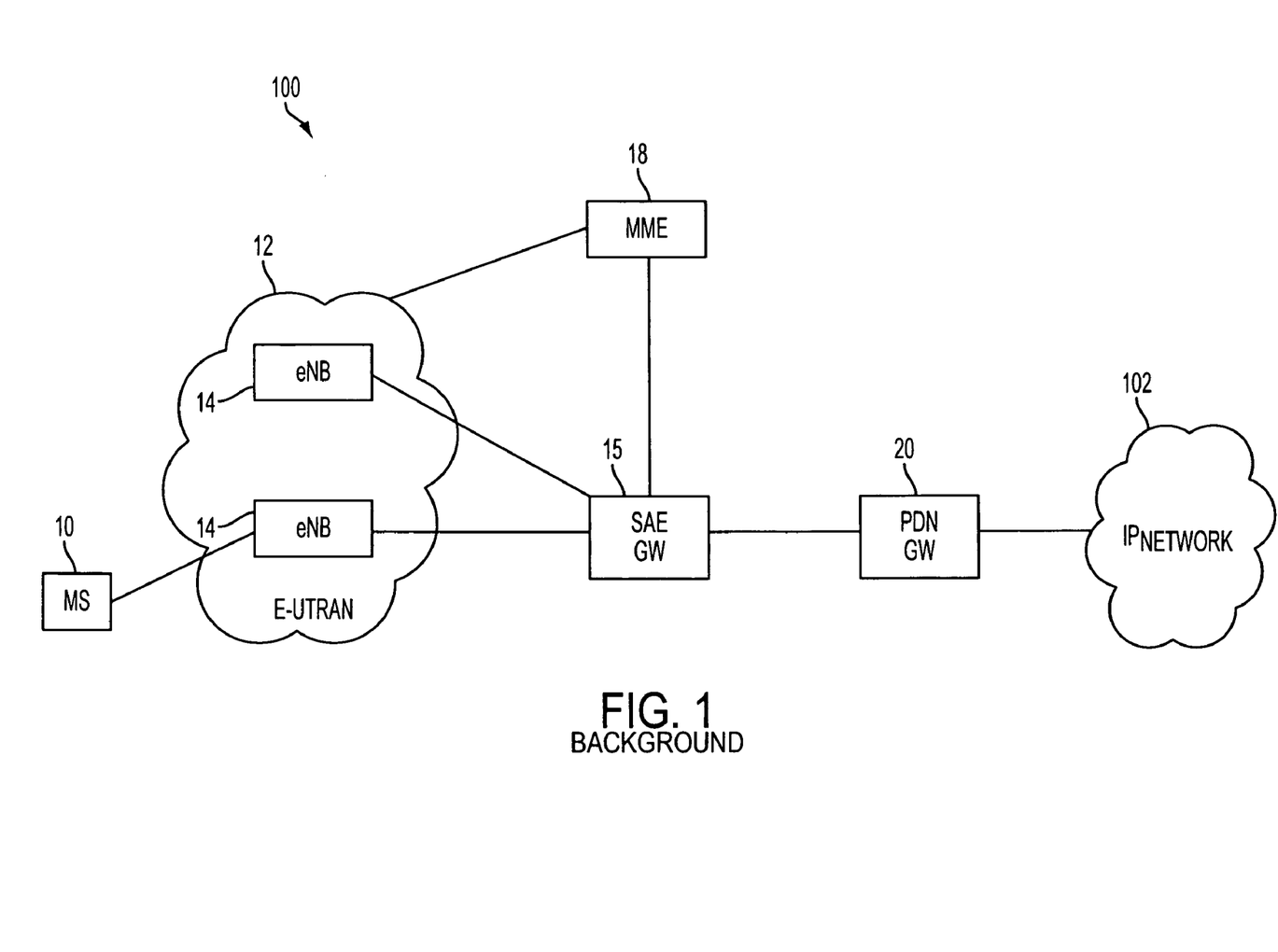
FIG. 1 depicts an exemplary communication network for providing a user's mobile station with Internet Protocol (IP) connectivity.

A modern wireless communication network, such as a 3rd or 4th generation wireless network, combines a radio access network (RAN) with an Internet Protocol (IP) network. The RAN supports wireless connectivity over the airlink with a user's mobile station (MS), whereas the IP network provides the MS with access to IP services. For example, FIG. 1 illustrates a wireless communication network 100 based on the Evolved 3rd Generation Partnership Program (3GPP) Packet Switching Domain.

The wireless network 100 involves a radio access technology that enables an MS 10 to access an IP network 102 over an Evolved Universal Terrestrial Radio Access Network (E-UTRAN) 12. A base station called an Evolved Node B (eNB) 14 may serve as a hub for radio communications over the E-UTRAN 12. One or more eNBs 14 may be provided in the E-UTRAN 12 for supporting all sub-layers of an airlink protocol carried out for transmitting and/or receiving data packets to and/or from the MS 12.

A service access entity gateway (SAE GW) 16 terminates the MS interface towards the E-UTRAN 12. The SAE GW 16 performs packet routing and forwarding, provides lawful interception of the MS traffic, serves as a local mobility anchoring point for supporting handover between the eNBs 14, and relays traffic between the E-UTRAN 12 and the IP network 102. The network 100 also includes a Mobility Management Entity (MME) 18 for performing mobility management functions such as MS authentication, keeping track of its current location, paging and roaming.

A Packet Data Network Gateway (PDN GW) 20 is provided between the IP network 102 and the SAE GW 16. The PDN GW 20 supports an interface to the IP network 200. In particular, the PDN GW 20 allocates an IP address to the MS 10, provides IP access policy enforcement, performs lawful interception of the IP traffic, supports billing and charging for IP services, and provides per-user based packet filtering.

Based on the coverage provided by the E-UTRAN 12, the network 100 may support MS communications in a limited area. When the MS 10 initiates an active call in the network 100, and then moves to an area which is not covered by the network 100, the initiated call has to be transferred to another network that may use another radio access technology. When the call is transferred to another network, the context relating to the active call, such as quality of service (QoS) context, security associations, compression context, link layer context (e.g. Point-to-Point Protocol), billing and charging information, and multicast session related information, is required to be transferred.

In addition, if the MS 10 is not capable of keeping both radio access technologies active at the same time, it needs to setup new radio access resources and link layer related information using the new radio access mechanism.

In existing IP-based wireless networks, when transitioning between network technologies, the call handover latency is unacceptably high for real-time traffic applications such as Voice over IP (VoIP) or streaming video. Due to the high call handover latency, a user may experience a large break in a video or a voice conversation, or a call may be dropped.

Therefore, there is a need for a handover mechanism that would minimize the handover latency to enable the MS to move seamlessly between networks with different radio access technologies.

SUMMARY OF THE DISCLOSURE

A data communication system and method are disclosed herein, which incorporate concepts to address the above noted problems with switching between different radio access technologies during an active wireless communication session.

In accordance with one aspect of the disclosure, a communication system for providing a user's mobile station (MS) with an Internet Protocol (IP) connectivity, has an IP network gateway for allocating an IP address to the MS to enable it to access an IP network. The system may include first and second base stations respectively configured to support communications of the MS over first and second radio access networks using different radio access technologies.

A first access gateway provides an interface between the IP network gateway and the first radio access network, whereas a second access gateway provides an interface between the IP network gateway and the second radio access network. For example, the first access gateway may operate in accordance with the 3rd Generation Partnership Project (3GPP) standard, and the second access gateway may operate in accordance with the Code Division Multiple Access 2000 (CDMA2000) standard.

A handover interface is provided between the first access gateway and the second access gateway for enabling the MS to switch between the first radio access network and the second radio access network with minimum latency.

An IP address allocated by the IP network gateway to the MS connected to the first radio access network may be maintained when the MS is connected to the second radio access network. The first and second access gateways may communicate with the IP network gateway using Proxy Mobile IP protocol.

The handover interface may transfer between the first access gateway and the second access gateway session-related context associated with an active wireless communication session originated before the user's mobile station performs switching between the first radio access network and the second radio access network.

The session-related context may provide context required for the MS to continue an IP session performed over the first radio access network when the MS switches from the first radio access network to the second radio access network.

In particular, the session-related context may include context for setting up a link layer to provide radio access of the user's mobile station required to continue the IP session.

Further, the session-related context may include context for establishing a network layer to provide IP connectivity of the user's mobile station required to continue the IP session.

Also, the session-related context may include policy and security context required to continue the IP session.

Moreover, the session-related context may include compression context defining a compression mechanism used for the IP session.

Further, the session-related context may include quality of service context defining quality of service information for the IP session.

Also, the session-related context may include billing and charging context defining billing and charging information for the IP session.

Further, the handover interface may provide a bearer path between the first access gateway and the second access gateway. This bearer path may enable the MS to continue a call performed over the first radio access network when the MS switches from the first radio access network to the second radio access network.

In accordance with the embodiment of the disclosure, when the MS initiates switching to the second radio access network, the first base station may provide the first access gateway with a first handover request. The first access gateway may respond by producing a second handover request transmitted to the second access gateway.

In response to the second handover request, the second access gateway may produce a handover response transmitted to the first access gateway to set up a link layer tunnel for providing communications between the first access gateway and the second access gateway. In particular, context-related information may be transferred over this gateway.

When the MS performs handover from the first radio access network to the second radio access network, the IP network gateway may use this tunnel to communicate with the MS.

In accordance with another aspect of the disclosure, a method of enabling an MS communicating over a first radio access network to move to a second radio access network involves initiating connection of the MS to the second radio access network based on a radio access condition in the first radio access network, and establishing a handover interface between the first access gateway and the second access gateway for transferring session-related context required to continue over the second radio access network an IP session performed by the MS over the first radio access network.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF DRAWINGS

The following detailed description of the embodiments of the present disclosure can best be understood when read in conjunction with the following drawing figures that depict concepts by way of example, not by way of limitations. In the figures, like reference numerals refer to the same or similar elements.

DETAILED DISCLOSURE OF THE EMBODIMENTS

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The present disclosure will be made using the example of a handover mechanism applied when a user's mobile station (MS) moves from a wireless network using a 4th generation (4G) radio access technology such as that defined in the 3rd Generation Partnership Program (3GPP) TS 23.401 technical specification, to a wireless network involving a 3rd generation (3G) radio access technology such as that defined in the Code Division Multiple Access (CDMA) 2000 standard. However, one skilled in the art will realize that the disclosed handover mechanism is applicable for MS switching between any wireless networks that use different radio access technologies.

Figure 2:
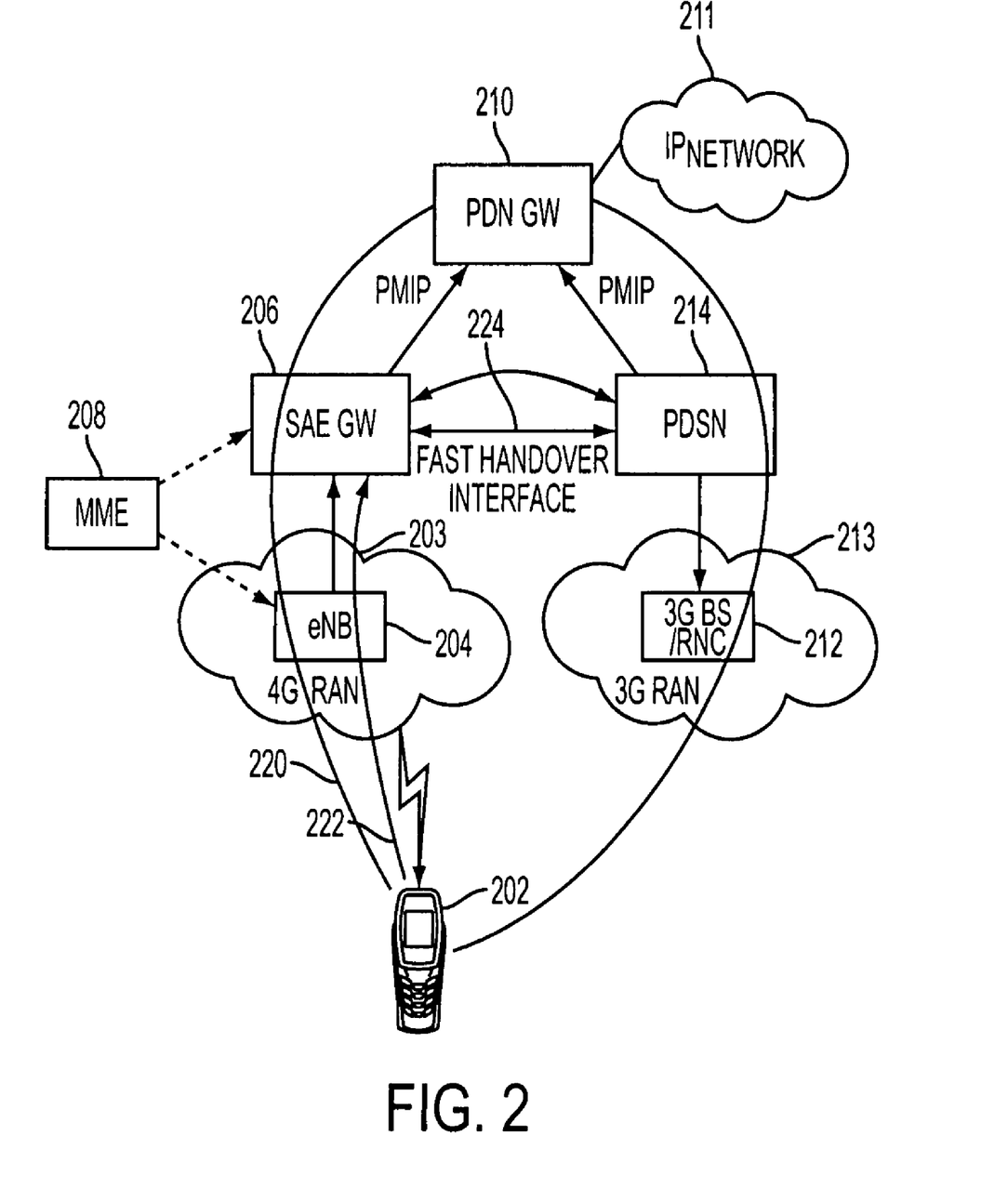
FIG. 2 illustrates an example of a fast handover architecture of the present disclosure.

FIG. 2 illustrates exemplary context transfer operations performed when an MS 202 moves from a wireless network using a 4G radio access technology defined in the 3GPP TS 23.401 technical specification to a wireless network using a 3G radio access technology defined in the CDMA2000 standard. In particular, the drawing shows such elements of the 4G wireless network as an Evolved Node B(eNB) 204 that serves as a base station, a service access entity gateway (SAE GW) 206, a mobile management entity (MME) 208 and a packet data network gateway (PDN GW) 210.

As discussed in connection with FIG. 1, the 4G wireless network involves a radio access technology that enables an MS 202 to access an IP network 211 over a 4G radio access network (RAN) 203 such as an Evolved Universal Terrestrial Radio Access Network (E-UTRAN). The eNB 204 that serves as a hub for radio communications over the E-UTRAN is responsible for supporting all sub-layers of an airlink protocol for transmitting and/or receiving data packets to and/or from the MS 202 over a radio access link.

The SAE GW 206 performs packet routing and forwarding, provides lawful interception of the MS traffic, serves as a local mobility anchoring point for supporting handover between eNBs 204, and relays traffic between the E-UTRAN and the IP network 211. The MME 208 performs mobility management functions such as MS authentication, keeping track of its current location, paging and roaming.

The PDN GW 210 provides an interface to the IP network 211. In particular, the PDN GW 210 allocates an IP address to the MS 202, provides IP access policy enforcement, performs lawful interception of the IP traffic, supports billing and charging for IP services, and provides per-user based packet filtering.

The 3G wireless network is represented by a 3G base station/radio network controller (3G BS/RNC) 212. In the 3G network, the base station (BS) may be arranged on the same platform with the radio network controller (RNC) or on different platforms. The BS supports packet transmission and/or reception to and/or from a user's MS over a 3G radio access network (RAN) 213 such as a CDMA2000 radio access network. The RNC provides control functionalities for the BS.

Another component of the 3G wireless network defined in the CDMA2000 standard is a packet data service node (PDSN) 214 that acts as the connection point between the radio access network and the IP network 211. The PDSN is responsible for managing Point-to-Point Protocol (PPP) sessions between the IP network 211 and the MS. It provides mobility management functions and packet routing functionality.

The PDN GW 210 provides an interface to the IP network 211 for both the 4G and 3G wireless networks represented in FIG. 2. As discussed in more detail later, to avoid interruption of an IP-based session originated in the 4G network when the MS 202 moves to the 3G network, the IP address allocated by the PDN GW 210 to the MS 202 in the 4G network is maintained in the 3G network. In accordance with the present disclosure, this feature may be supported, for example, by establishing a network based mobility protocol called Proxy Mobile IP (PMIP) between the PDN GW 210 and the PDSN 214, as well as between the PDN GW 210 and the SAE GW 206. The PMIP is a protocol defined in Internet Draft "Proxy Mobile IPv6 draft-ietf-netlmm-proxymip6-06.txt" submitted on Sep. 23, 2007. The PMIP is based on an external node acting as a proxy Mobile Node that registers the location of an IP-based communication device and is accessible while the device is on the network. When the MS 202 is active on the 4G network, PMIP between the PDN GW 210 and the SAE GW 206 is active. When the MS 202 moves from the 4G network to the 3G network, PMIP becomes active between the PDN GW 210 and the PDSN 214. In both cases, the PDN GW 210 acts as an IP anchor point and provides an IP address to the MS 202. Although the present disclosure is made with the example of the PMIP protocol, one skilled in the art will realize that the disclosed handover mechanism may be implemented using any network based mobility protocol such as Generic Transport Protocol (GTP).

As illustrated in FIG. 2, when the MS 202 uses the 4G wireless network for a wireless communication session, such as a Voice over IP (VoIP) call, signaling and bearer paths are established from the MS 202 to the PDN GW 210 via the eNB 204 and the SAE GW 206 (line 220). During the session, the MS 202 performs a periodic measurement of radio signals from the eNB 204. At some point of time, the MS 202 can move out of the range of the eNB 204. If the MS 202 is in the range covered by the 3G BS/RNC 212 of the 3G wireless network, the MS 202 needs to perform handover to the 3G wireless network.

To carry out the handover, the MS 202 indicates to the SAE GW 206 that handover from the eNB 204 to the 3G BS/RNC 212 is initiated (line 222). Thereafter, the handover of the MS 202 from the eNB 204 to the 3G BS/RNC 212 is performed over a data link layer, i.e. Layer 2 of the Open Systems Interconnection (OSI) Basic Reference Model. The Layer 2 handover from one base station to another base station is well known to one skilled in the art of wireless communications.

When the SAE GW 206 receives the handover indication from the MS 202, the SAE GW 206 sends a Handover Request to the PDSN 214 to initiate a Fast Handover Interface 224 to the PDSN 214, and begins a context transfer procedure to transfer to the PDSN 214 session-related context, i.e. the context of an active wireless communication session, such as an IP-based telephone call or any other IP-based transaction, involving the MS 202 and originated before the MS 202 initiated switching between the 4G network and the 3G network. A call flow that illustrates operations performed in connection with the Fast Handover Interface 224 is described in more detail later. Although the handover operations are explained using the example of switching from the 4G network to the 3G network, one skilled in the art would realize that moving from the 3G network to the 4G network involves similar handover operations.

The context transfer procedure includes establishing a Layer 2 tunnel between the SAE GW 206 and the PDSN 214 over the Fast Handover Interface 224. The Layer 2 tunnel may be used to carry transit bearer traffic between the SAE GW 206 and the PDSN 214. For example, the Layer 2 tunnel may utilize Generic Routing Encapsulation (GRE), which is a tunneling protocol developed by Cisco Systems to encapsulate network layer packets inside IP tunneling packets. The original packet is the payload for the final packet. Alternatively, the Layer 2 tunnel may use IP tunneling, which is a known process of embedding one IP packet inside of another, for the purpose of simulating a physical connection between two remote networks across an intermediate network.

The session-related context transferred from the SAE GW 206 to the PDSN 214 over the Fast Handover Interface 224 may include Layer 2 context prepared using 4G radio access technology for application in the 3G network. The Layer 2 context may represent PPP connection or an equivalent data link layer. When the MS 202 is being connected to the 3G wireless network, PPP connection is required. To minimize interruption time during the handover from the 4G network to the 3G network, the PPP connection is established between the MS 202 and the PDSN 214, while the MS 202 is still connected to the 4G wireless network. When the MS 202 indicates that it needs a handover, the SAE GW 206 initiates establishing the Fast Handover Interface 224 to the PDSN 214. The SAE GW 206 along with the eNB 204 provides a transport connection between the MS 202 and the PDSN 214 to establish the PPP connection. The setting up of a Layer 2 context is explained in more detail later.

Further the context transfer procedure may include transferring policy and security context. In particular, when the MS 202 connects to the 4G wireless network, subscriber authentication is performed. For example, the authentication may be carried out using security keys such as IPsec keys. If the MS 202 moves from the 4G network to the 3G network, authentication may be again required. This will add up to the handover interruption time. To minimize handover interruption time, the context transfer procedure of the present disclosure involves transferring authentication information from the SAE GW 206 to the PDSN 214 when the MS 202 moves from the 4G network to the 3G network.

Also, the context transfer procedure may include transferring compression context. When an MS operates in a wireless network, a compression mechanism is used between the MS and a serving gateway to reduce airlink overhead. For example, in the 4G network, the compression context is set up using negotiations between an MS and an SAE GW. The compression content may involve an IP/UDP/RTP (Internet Protocol/User Datagram Protocol/Real-Time Transport Protocol) header compression information. In a conventional system, when an MS moves from one wireless access technology to another wireless access technology, it has to begin operations in a new network in an uncompressed mode. Then the MS has to re-negotiate compression context before a compression mechanism can be utilized. To enable the MS 202 to use the compression mechanism without re-negotiating the compression context when it moves from the 4G network to the 3G network, the context transfer procedure of the present disclosure may include transferring the compression context over the Fast Handover Interface 224 from the SAE GW 206 to the PDSN 214.

Further, the context transfer procedure may include transferring Quality of Service (QoS) context. As 4G wireless networks are based on IP protocols, all real-time applications carried out in 4G networks, such as a VoIP application, depend on IP protocols. QoS is an important aspect of delivering quality signals in IP networks. For example, the MS 202 may perform a voice call in the 4G network. A voice call requires a specific QoS treatment to meet latency and jitter requirements. The SAE GW 206 is responsible for QoS operations with IP packets in the 4G network. In particular, the SAE GW 206 may perform QoS bit marking to form an 8-bit Differentiated Services Code Point (DSCP) byte or an 8-bit Type of Service (ToS) byte in an IP packet. The QoS bit marking is different for different types of service. When the MS 202 moves from the 4G network to the 3G network, the PDSN 214 has no knowledge of what type of QoS treatment needs to be provided to a specific IP packet flow to or from the MS 202. To provide this information, the context transfer procedure of the present disclosure may include transferring the QoS context, such as a type of QoS bit marking, over the Fast Handover Interface 224 from the SAE GW 206 to the PDSN 214 when the MS 202 moves from the 4G network to the 3G network.

Also, the context transfer procedure may include transferring Layer 2 Handoff context that relates to the Layer 2 context required for setting a Layer 3 (network layer in the OSI model). In particular, when the MS 202 moves between the 4G network and the 3G network, Layer 3 handover should be performed because an IP-related context of an active VoIP call changes due to a change in network nodes providing access to the IP network 211. In some cases, the IP address assigned to the MS 202 may change. However, to perform active VoIP communication without interruptions, IP address assigned to the MS 202 in the 4G network should be maintained in the 3G network.

To maintain the IP address assigned to the MS 202, the context transfer procedure of the present disclosure may include transfer of the Layer 2 context required to perform Layer 3 handover. This context may include information identifying radio channels, signals, neighboring cell lists required to transfer the MS 202 from a source base station to a destination base station. The context transfer procedure of the present disclosure may include transferring this information over the Fast Handover Interface from the SAE GW 206 to the PDSN 214 when the MS 202 moves from the 4G network to the 3G network.

Moreover, when the MS 202 is involved in an active call, billing and charging information is collected by a serving gateway. In particular, when the MS 202 is involved in an active call in the 4G network, billing and charging information is collected by the SAE GW 206. When the MS 202 moves from the 4G network to the 3G network, billing and charging information has to be collected by the PDSN 214. In a conventional system, the PDSN 214 will have no information on billing and charging that relates to a call performed over the 4G network. To enable the 3G network to obtain this information, the context transfer procedure of the present disclosure may include transferring billing and charging context over the Fast Handover Interface 224 when the MS 202 moves from the 4G network to the 3G network.

Hence, the Fast Handover Interface 224 between the SAE GW 206 and the PDSN 214 may be used for transferring context relevant to an active call involving the MS 202 and performed over the 4G network before the MS 202 moves to the 3G network. After transferring the relevant context, the Layer 3 handover is performed over the Fast Handover Interface 224 to set a Layer 3 connection defining IP-related parameters of the active call in the 3G network. As discussed above, as the Layer 2 context required for setting the Layer 3 connection in the 3G network was already transferred during the context transfer procedure, the PDN GW 210 may maintain in the 3G network the same IP address of the MS 202 as the IP address allocated in the 4G network. Therefore, an active VoIP call originated in the 4G network may continue in the 3G network without interruption. After establishing the Layer 3 connection, the MS 202 is enabled to communicate in the 3G network using the 3G BS/RNC 212, the PDSN 214 and the PDN GW 210.

Figure 3:
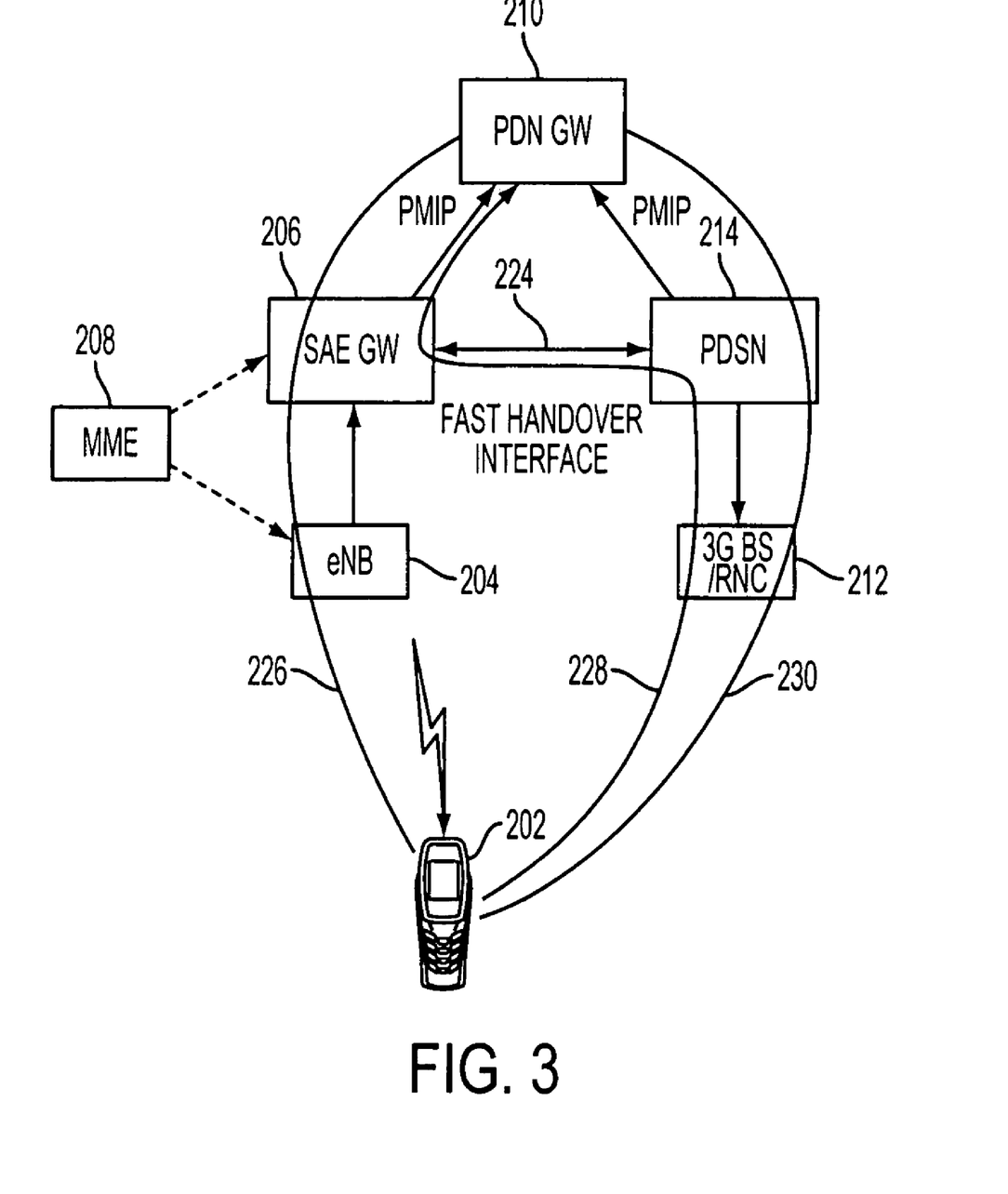
FIG. 3 illustrates a handover bearer path configured when a user's mobile station (MS) switches between different radio access technologies.

FIG. 3 illustrates establishing in the 3G network a bearer path, such as a VoIP path, for a call originated in the 4G network when the MS 202 moves from the 4G network to the 3G network. When the MS 202 operates in the 4G network, a bearer path for a call involving the MS 202 is established between the MS 202 and the PDN GW 210 over the eNB 204 and the SAE GW 206 (line 226). Line 228 shows a bearer path when the MS 202 is in process of performing the Layer 3 handover between the 4G network and the 3G network. In this case, the bearer path still goes from the PDN GW 210 to the SAE GW 206 because the connection between the PDN GW 210 and the PDSN 214 is not ready yet. However, as the MS 202 has already switched from a radio access connection with the eNB 204 to a radio access connection with the 3G BS/RNC 212, the SAE GW 206 directs data traffic over the Fast Handover Interface 224 to the PDSN 214 that delivers the traffic to the MS 202 over the 3G BS/RNC 212. Similarly, traffic originated by the MS 202 goes to the PDN GW 210 via the 3G BS/RNC 212, the PDSN 214, the Fast Handover Interface 224 and the SAE GW 206.

When the Layer 3 handover is completed and the connection between the PDN GW 210 and the PDSN 214 is established, a bearer path between the MS 202 and the PDN GW 210 goes over the 3G BS/RNC 212 and the PDSN 214 (line 230). Hence, the Fast Handover Interface 224 carries the data traffic flowing between the MS 202 and the PDN GW 210 when the MS 202 is in process of switching between the 4G network and the 3G network.

Figure 4:
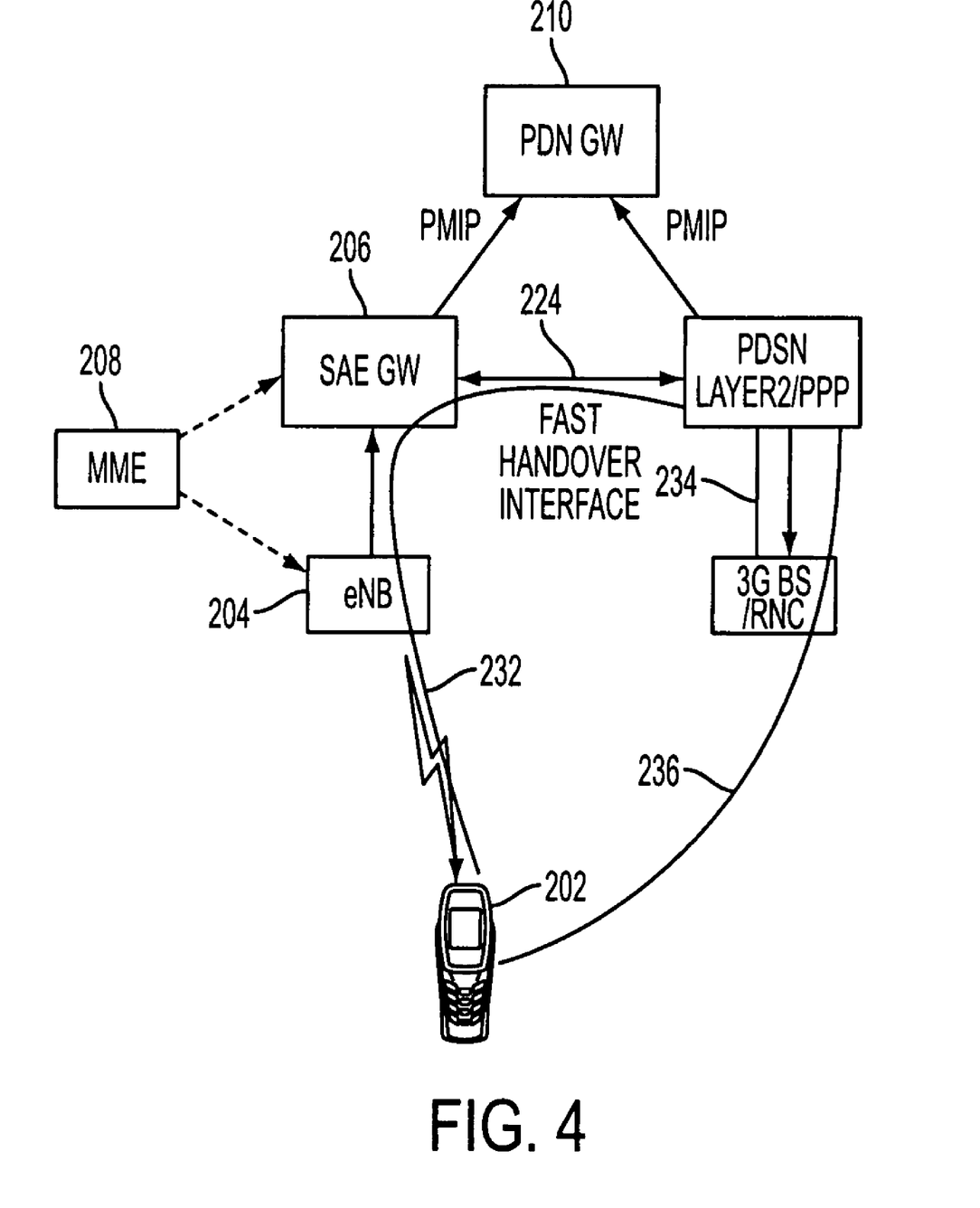
FIG. 4 illustrates setting up Layer 2 when the MS switches between different radio access technologies.

FIG. 4 illustrates preparing a Layer 2 link, such as a PPP link or an equivalent connection, to be used over the 3G network when the MS 202 switches from the 4G network to the 3G network. In particular, in response to a handover request from the MS 202, the SAE GW 206 creates a transfer context link between the SAE GW 206 and the PDSN 214 over the Fast Handover Interface 224 (line 232). The transfer context link may be used to carry control signaling and as a bearer path. Over the transfer context link, the MS 202 sends a Layer 2 setup request to the PDSN 214. Complete Layer 2 setup process is performed using the 4G radio access. The MS 202 continues to use the same IP address as the IP address assigned in the 4G network.

In response to the Layer 2 setup request, the PDSN 214 prepares the 3G BS/RNC 212 for establishing the Layer 2 connection with the MS 202 to be used as soon as the MS 202 jumps to the 3G network (line 234). The new radio resource allocation is communicated to the MS 202 from the PDSN 214 through a path established over the SAE GW 206 and the eNB 204.

Once the MS 202 switches to the 3G radio access, it immediately uses a path to the PDN GW 210 established over the 3G BS/RNC 212 and the PDSN 214 (line 236). Hence, the Fast Handover Interface 224 is used to prepare the Layer 2 link setup for the 3G access, while the MS 202 is still on the 4G network. As a result, when the MS 202 switches from the 4G network to the 3G network, the handover interruption time is minimized.

Figure 5:
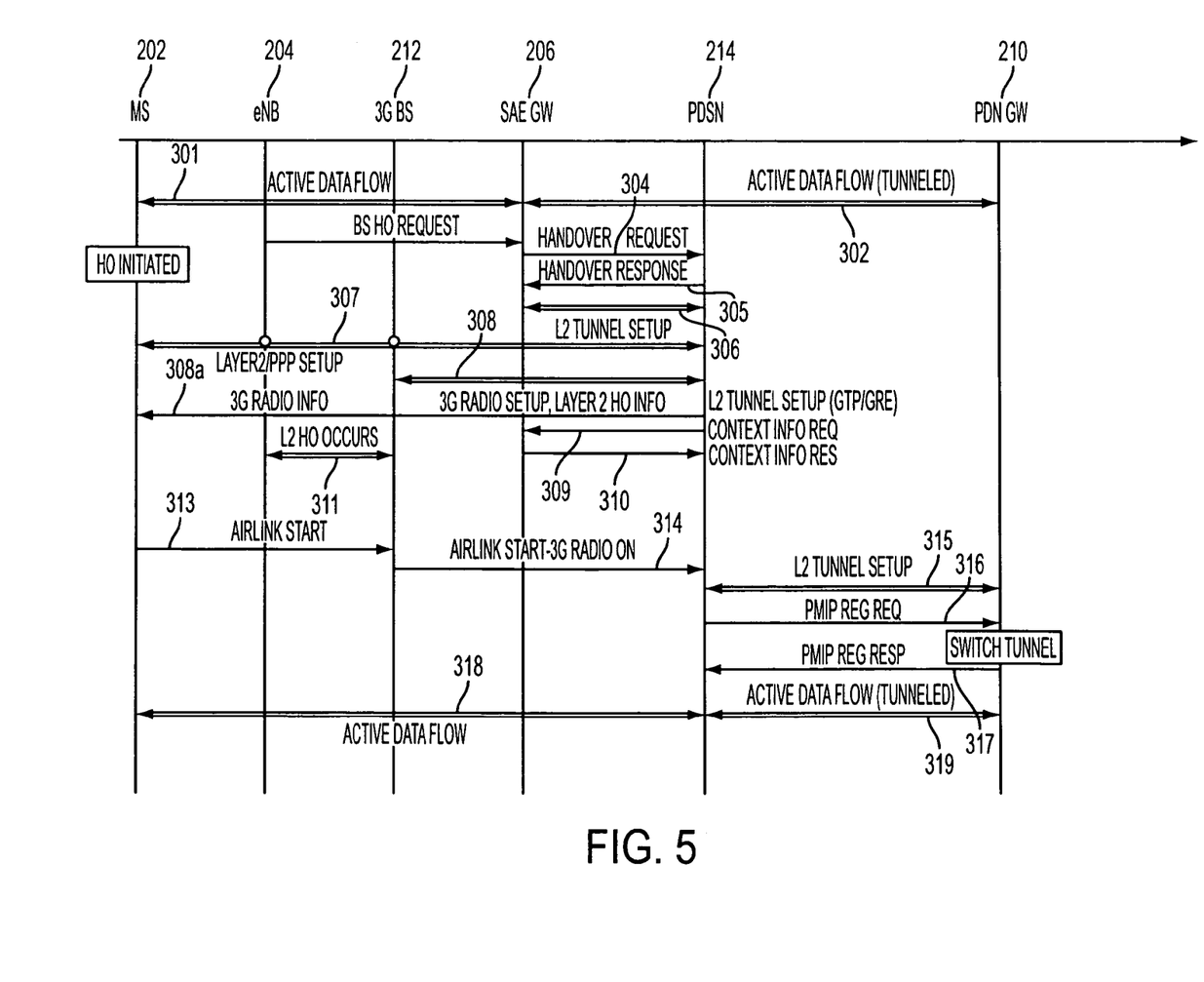
FIG. 5 shows an exemplary handover call flow for switching the MS between different radio access technologies.

FIG. 5 illustrates an exemplary handover call flow for a scenario when the MS 202 goes from the 4G radio access to the 3G radio access. When a call is set up in the 4G network, a data path 301 is established between the MS 202 and the SAE GW 206. The data path 301 may carry any IP data such as Real Time Protocol (RTP) data for a VoIP call. The SAE GW 206 acts as a proxy mobile agent (PMA) for proxy mobile IP communication between the SAE GW 206 and the PDN GW 210 which acts as a local mobility agent (PMA). The proxy mobile IP communication between the SAE GW 206 and the PDN GW 210 is performed over a tunneled data path 302.

Based on radio access conditions, the MS 202 may decide to switch from the 4G radio access provided over the 4G network to the 3G radio access offered by the 3G network, i.e. to initiate handover (HO). In this case, the eNB 204 sends a base station handover (BS HO) request 303 to the SAE GW 206. The BS HO request 303 indicates that the MS 202 needs to perform handover to the 3G radio access network.

In response to the BS HO request 303, the SAE GW 206 sends a handover request 304 to the PDSN 214 to create a horizontal context transfer link. A VoIP/RTP mechanism may be used to carry signaling traffic and transit bearer traffic over this link.

The PDSN 214 may respond with a handover response message 305 indicating that the PDSN 214 has resources available for handover from the 4G network to the 3G network and is ready to perform the handover. After receiving the PDSN 214 response, the SAE GW 206 initiates a Layer 2 (L2) tunnel setup 306 between the SAE GW 206 and the PDSN 214. The Layer 2 tunnel may use the General Packet Radio Service tunneling protocol (GTP), Generic Routing Encapsulation (GRE) or any other similar tunneling protocol for carrying traffic required to perform one or more handover context transfers between the SAE GW 206 and the PDSN 214.

After the PDSN 214 is able to communicate with the MS 202 through the SAE GW 206 and the eNB 204, the PDSN 214 may perform Layer 2 negotiations and setup Layer 2 link (line 307). The MS 202 is assigned with the same IP address as the address used by the MS 202 in the 4G network. Further, the PDSN 214 may communicate with the MS 202 about 3G radio resource requirements.

Thereafter, a Layer 2 tunnel 308 may be set up between the 3G BS 212 and the PDSN 214. The Layer 2 tunnel 308 may use GTP, GRE or any other similar tunneling protocol for carrying traffic. In particular, the PDSN 214 may inform the 3G BS 212 about radio resource requirements of the MS 202 and may provide information related to Layer 2 handover. In response, the 3G BS 212 may reserve required radio resources and may prepare for the Layer 2 handover.

Then, the PDSN 214 sends a message 308a to the MS 202 over the 4G network to inform the MS 202 about agreed upon 3G radio resources. After sending the message 308a, the PDSN 214 is ready for switching the MS 202 to the 3G network. Therefore, the PDSN 214 sends a context information request 309 to the SAE GW 206 to request the context information related to the MS 202. The context information is described above in connection with FIG. 2. The SAE GW 206 responds with a context information response 310 containing the requested context information. After receiving the context information, the PDSN 214 is ready to handle traffic relating to the MS 202.

Layer 2 handover (L2 HO) 311 occurs between the eNB 204 and the 3G BS 212 to enable transfer of the MS 202 from the 4G radio access to the 3G radio access. An Airlink Start signal 313 is transmitted from the MS 202 to the 3G BS 212 to initiate 3G radio access. In response, the 3G BS 212 provides the PDSN 214 with an Ailink Start-3G radio ON signal 314 to indicate that the MS 202 is on the 3G network.

This signal triggers the PDSN 214 to set up a link to the PDN GW 210. If a Layer 2 tunnel does not exist between the PDSN 214 and the PDN GW 210, a Layer 2 tunnel 315 is established. This tunnel may use GTP, GRE or any other similar tunneling protocol to assist local mobility.

The PDSN 214 may make a Proxy Mobile IP (PMIP) registration request 316 to the PDN GW 210. In response, the PDN GW 210 may generate a PMIP registration response 317. The PMIP registration exchange is used for switching a tunnel linked to the PDN GW 210 and used for carrying bearer traffic for the MS 202. As discussed above, a network based mobility protocol called Proxy Mobile IP (PMIP) may be established between the PDN GW 210 and the PDSN 214, as well as between the PDN GW 210 and the SAE GW 206. The PMIP is defined in the Request for Comments (RFC) 3344 entitled "IP Mobility Support for IPv4," dated August 2002. The PMIP is based on an external node acting as a proxy Mobile Node that registers the location of an IP-based communication device and is accessible while the device is on the network. When the MS 202 is active on the 4G network, PMIP between the PDN GW 210 and the SAE GW 206 is active. When the MS 202 moves from the 4G network to the 3G network, PMIP becomes active between the PDN GW 210 and the PDSN 214. Hence, when the MS 202 is moved to the 3G network, the PDN GW 210 switches the tunnel and begins using the tunnel to the PDSN 214 instead of the tunnel to the SAE GW 206. In both cases, the PDN GW 210 acts as an IP anchor point and provides the same IP address to the MS 202.

After switching the PDN GW tunnel, an active data flow 318 is carried over the 3G network between the MS 202 and the PDSN 214 through the 3G BS 212, and a tunneled active data flow 319 is carried through the tunnel between the PDSN 214 and the PDN GW 210. Thereafter, the 4G network releases resources dedicated to the MS 202.

Figure 6:
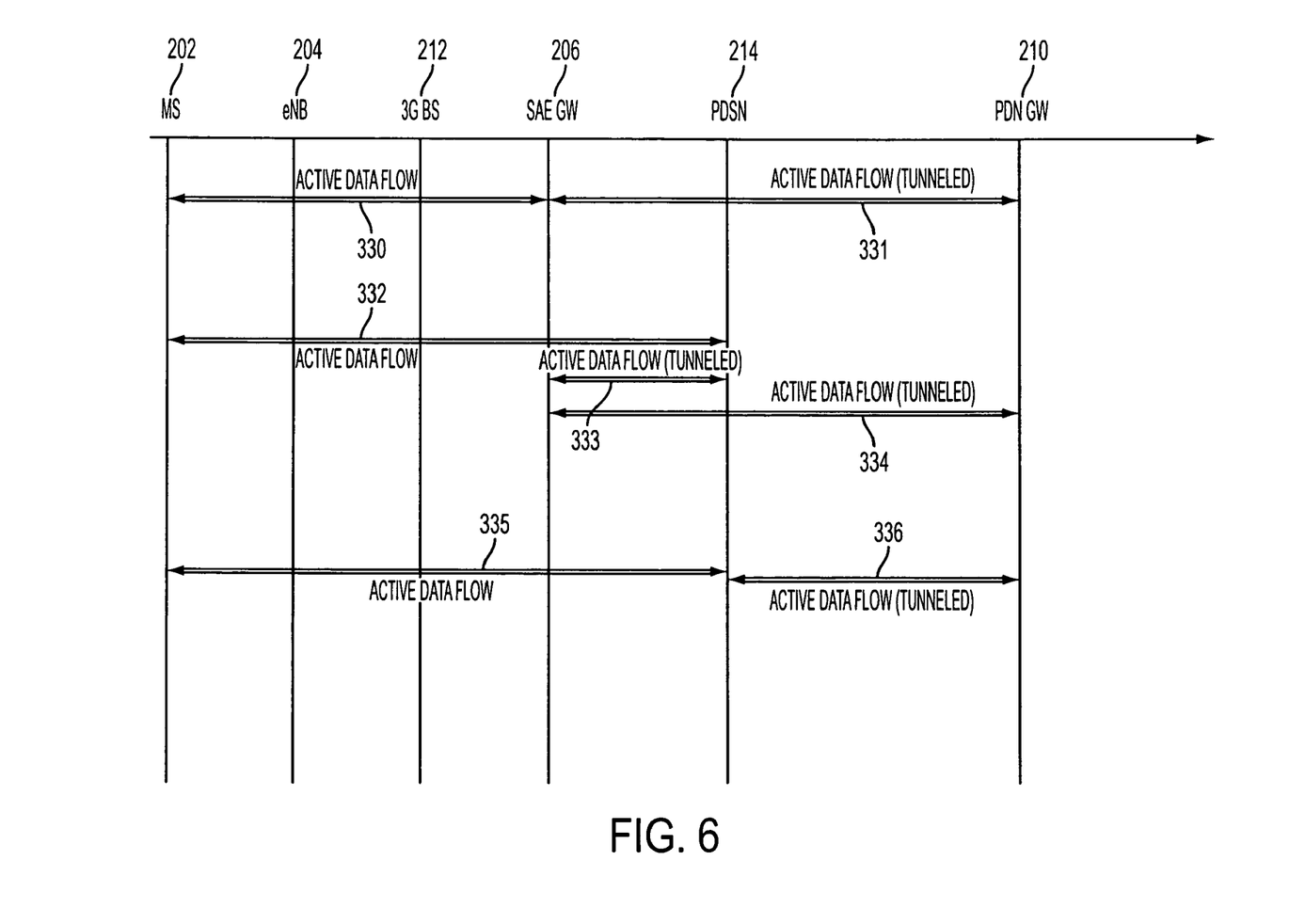
FIG. 6 shows active data flows at various stages of MS switching between different radio access technologies.

FIG. 6 illustrates data flows at various stages of MS switching. In particular, when the MS 202 uses the 4G network before handover to the 3G network is initiated, an active data flow 330 is carried between the MS 202 and the SAE GW 206, and a tunneled active data flow 331 is carried through the tunnel between the PDN GW 210 and the SAE GW 206.

When the MS 202 starts using the 3G network but still performs the handover procedure, an active data flow 332 is carried between the MS 202 and the PDSN 214, a tunneled active data flow 333 is carried between the SAE GW 206 and the PDSN 214, and a tunneled active data flow 334 is carried between the SAE GW 206 and the PDN GW 334.

When the MS 202 uses the 3G network after completing the handover, an active data flow 335 is carried between the MS 202 and the PDSN 214, and a tunneled active data flow 336 is carried between the PDSN 214 and the PDN GW 210.

Figure 7:
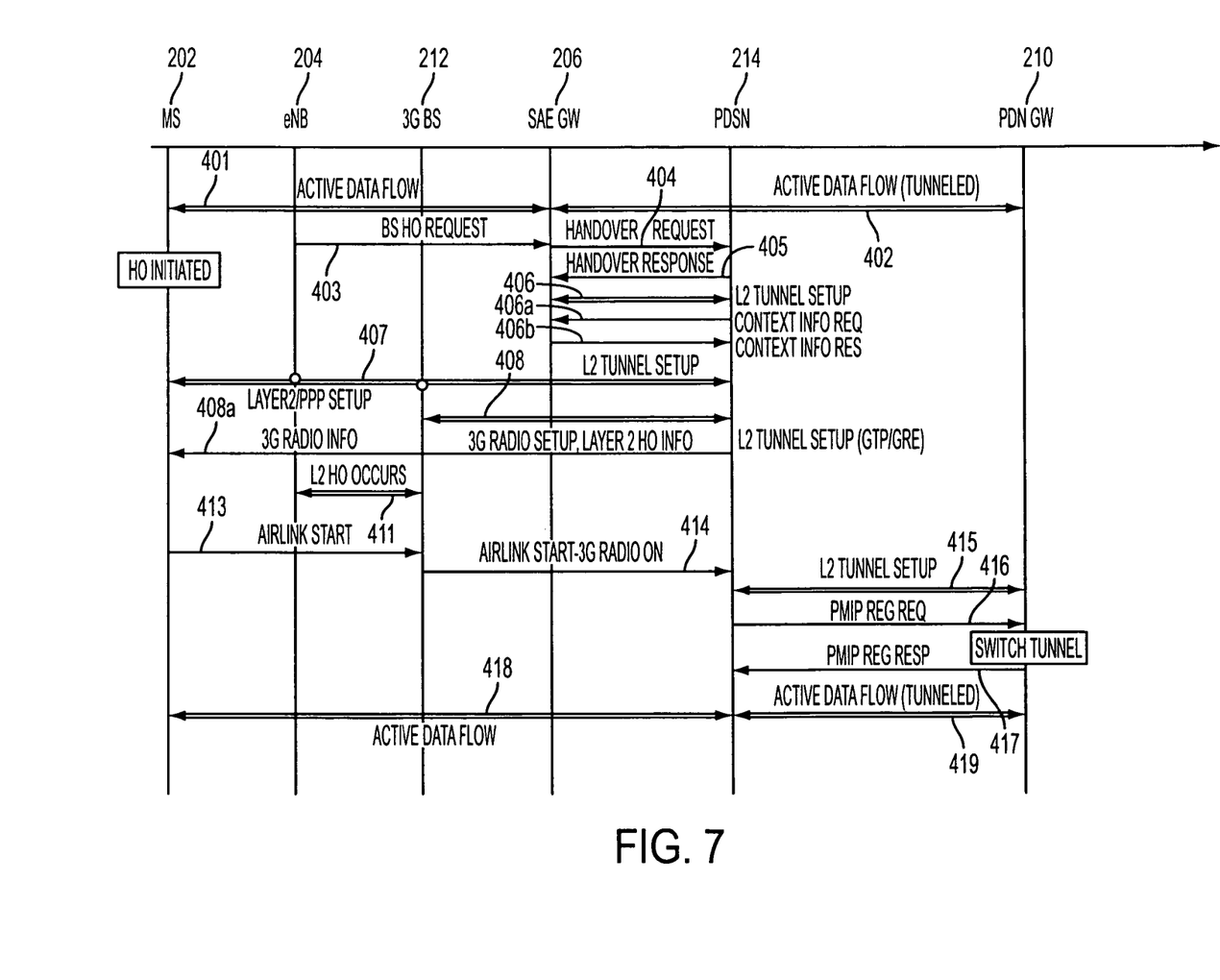
FIG. 7 shows another example of a handover call flow for switching the MS between different radio access technologies.

FIG. 7 illustrates another example of a call flow for switching the MS 202 from the 4G radio access technology to the 3G radio access technology. This call flow begins in the manner similar to the call flow discussed in connection with FIG. 5. In particular, when a call is setup in the 4G network, a data path 401 is established between the MS 202 and the SAE GW 206. The data path 401 may carry any IP data such as Real Time Protocol (RTP) data for a VoIP call. The proxy mobile IP communication between the SAE GW 206 and the PDN GW 210 is performed over a tunneled data path 402.

Based on radio access conditions, the MS 202 may decide to switch from the 4G network to the 3G network, i.e. to initiate handover. In this case, the eNB 204 sends a base station handover (BS HO) request 403 to the SAE GW 206. The BS HO request 403 indicates that the MS 202 needs to perform handover to the 3G radio access network.

In response to the BS HO request 403, the SAE GW 206 sends a handover request 404 to the PDSN 214 to create a horizontal context transfer link. The PDSN 214 may respond with a handover response message 405 indicating that the PDSN 214 has resources available for handover from the 4G network to the 3G network and is ready to perform the handover. After receiving the PDSN 214 response, the SAE GW 206 initiates a Layer 2 (L2) tunnel setup 406 between the SAE GW 206 and the PDSN 214.

After this step, the call flow in FIG. 7 differs from the call flow in FIG. 5. In particular, after establishing the Layer 2 tunnel between the SAE GW 206 and the PDSN 214, the PDSN 214 may produce a context information request 406a to request the context information related to the MS 202. The context information is described above in connection with FIG. 2. The SAE GW 206 may respond with a context information response 406b containing the requested context information.

After the context is transferred to the PDSN 214, it may perform Layer 2 negotiations and setup Layer 2 link (line 407). The MS 202 is assigned with the same IP address as the address used by the MS 202 in the 4G network. Further, the PDSN 214 may communicate with the MS 202 about 3G radio resource requirements.

Thereafter, a Layer 2 tunnel 408 may be set up between the 3G BS 212 and the PDSN 214. In particular, the PDSN 214 may inform the 3G BS 212 about radio resource requirements of the MS 202 and may provide information related to the Layer 2 handover. In response, the 3G BS 212 may reserve required radio resources and may prepare for the Layer 2 handover. Then, the PDSN 214 may send a message 408a to the MS 202 over the 4G network to inform the MS 202 about agreed upon 3G radio resources.

Layer 2 handover (L2 HO) 411 occurs between the eNB 204 and the 3G BS 212 to enable transfer of the MS 202 from the 4G radio access to the 3G radio access. An Airlink Start signal 413 is transmitted from the MS 202 to the 3G BS 212 to initiate 3G radio access. In response, the 3G BS 212 provides the PDSN 214 with an Ailink Start-3G radio ON signal 414 to indicate that the MS 202 is on the 3G network.

This signal triggers the PDSN 214 to set up a link to the PDN GW 210. If a Layer 2 tunnel does not exist between the PDSN 214 and the PDN GW 210, a Layer 2 tunnel 415 is established. The PDSN 214 may make a Proxy Mobile IP (PMIP) registration request 416 to the PDN GW 210. In response, the PDN GW 210 may generate a PMIP registration response 417. The PMIP registration exchange is used for switching a tunnel linked to the PDN GW 210 and used for carrying bearer traffic for the MS 202.

After switching the PDN GW tunnel, an active data flow 418 is carried over the 3G network between the MS 202 and the PDSN 214 through the 3G BS 212, and a tunneled active data flow 419 is carried through the tunnel between the PDSN 214 and the PDN GW 210. Thereafter, the 4G network releases resources dedicated to the MS 202.

Hence, the handover mechanism of the present disclosure minimizes interruption of an IP session involving an MS connected to a first wireless network using one radio access technology when the MS switches to a second wireless network that uses another radio access technology.

While the foregoing has described what are considered to be the best mode and/or other preferred examples, it is understood that various modifications may be made therein and that the invention or inventions disclosed herein may be implemented in various forms and examples, and that they may be applied in numerous applications, only some of which have been described herein.

It is intended by the following claims to claim any and all applications, modifications and variations that fall within the true scope of the present teachings.

What is claimed is:

1. A communications system for providing a user's mobile station with an Internet Protocol (IP) connectivity, comprising:
   an IP network gateway for allocating an IP address to the user's mobile station to enable the user's mobile station to access an IP network,
   a first base station for supporting communications of the user's mobile station over a first radio access network using a first radio access technology,
   a first access gateway for providing an interface between the IP network gateway and the first radio access network,
   a second base station for supporting communications of the user's mobile station over a second radio access network using a second radio access technology different from the first radio access technology,
   a second access gateway for providing an interface between the IP network gateway and the second radio access network, and
   a handover interface provided between the first access gateway and the second access gateway for enabling the user's mobile station to switch between the first radio access network and the second radio access network.

2. The system of claim 1, wherein the first and second access gateways are configured to communicate with the IP network gateway using Proxy Mobile IP protocol.

3. The system of claim 1, wherein the IP address allocated to the user's mobile station connected to the first radio access network is maintained when the user's mobile station is connected to the second radio access network.

4. The system of claim 1, wherein the first access gateway is configured to operate in accordance with 3rd Generation Partnership Project (3GPP) standard.

5. The system of claim 1, wherein the second access gateway is configured to operate in accordance with Code Division Multiple Access 2000 (CDMA2000) standard.

6. The system of claim 1, wherein the handover interface is configured for transferring between the first access gateway and the second access gateway session-related context associated with an active wireless communication session originated before the user's mobile station performs switching between the first radio access network and the second radio access network.

7. The system of claim 6, wherein the session-related context provides context required for the user's mobile station to continue an IP session performed over the first radio access network when the user's mobile station switches from the first radio access network to the second radio access network.

8. The system of claim 7, wherein the session-related context includes context for setting up a link layer to provide radio access of the user's mobile station required to continue the currently performed call.

9. The system of claim 7, wherein the session-related context includes context for establishing a network layer to provide IP connectivity of the user's mobile station required to continue the IP session.

10. The system of claim 7, wherein the session-related context includes policy and security context required to continue the IP session.

11. The system of claim 7, wherein the session-related context includes compression context defining a compression mechanism used for the IP session.

12. The system of claim 7, wherein the session-related context includes quality of service context defining quality of service information for the IP session.

13. The system of claim 7, wherein the session-related context includes billing and charging context defining billing and charging information for the IP session.

14. The system of claim 1, wherein the handover interface is further configured for providing a bearer path between the first access gateway and the second access gateway.

15. The system of claim 14, wherein the bearer path is provided to continue a call currently performed over the first radio access network when the user's mobile station switches from the first radio access network to the second radio access network.

16. The system of claim 1, wherein the first base station is configured to provide the first access gateway with a first handover request when the user's mobile station initiates switching to the second radio access network.

17. The system of claim 16, wherein the first access gateway is responsive to the first handover request by producing a second handover request transmitted to the second access gateway.

18. The system of claim 17, wherein the second access gateway is responsive to the second handover request by producing a handover response transmitted to the first access gateway to set up a link layer tunnel for providing communications between the first access gateway and the second access gateway.

19. The system of claim 18, wherein the IP network gateway is configured to communicate with the user's mobile station over the tunnel between the first access gateway and the second access gateway when the user's mobile station performs handover from the first radio access network to the second radio access network.

20. A method of enabling a user's mobile station communicating over a first radio access network to transfer to a second radio access network in a communications system having an IP network gateway for allocating an IP address to the user's mobile station to provide access of the user's mobile station to an IP network, a first access gateway for providing an interface between the IP network gateway and the first radio access network, and a second access gateway for providing an interface between the IP network gateway and the second radio access network; the method including the steps of:

based on a radio access condition in the first radio access network, initiating connection of the user's mobile station to the second radio access network, and establishing a handover interface between the first access gateway and the second access gateway for transferring session-related context required to continue over the second radio access network an IP session related to the user's mobile station and originated using the first radio access network.

21. The method of claim 20, wherein the user's mobile station is configured to access the first radio access network using a first radio access technology and to access the second radio access network using a second radio access technology different from the first radio access technology.

22. The method of claim 20 further including the step of establishing a bearer path over the handover terminal to continue the call.

23. The method of claim 20 wherein the IP address allocated to the user's mobile station connected to the first radio access network is maintained when the user's mobile station is connected to the second radio access network.

* * * * *